(12) United States Patent
Okuley

(10) Patent No.: US 11,934,221 B2
(45) Date of Patent: Mar. 19, 2024

(54) ELECTRONIC DEVICES HAVING MULTIPLE MODES OF OPERATION

(71) Applicant: INTEL CORPORATION, Santa Clara, CA (US)

(72) Inventor: James M. Okuley, Portland, OR (US)

(73) Assignee: Intel Corporation, Santa Clara, CA (US)

(*) Notice: Subject to any disclaimer, the term of this patent is extended or adjusted under 35 U.S.C. 154(b) by 753 days.

(21) Appl. No.: 16/913,962

(22) Filed: Jun. 26, 2020

(65) Prior Publication Data

US 2020/0326747 A1    Oct. 15, 2020

(51) Int. Cl.
| | |
|---|---|
| *G06F 1/16* | (2006.01) |
| *G05B 15/02* | (2006.01) |
| *G06F 3/16* | (2006.01) |
| *G10L 15/22* | (2006.01) |
| *H02K 7/116* | (2006.01) |
| *H04R 1/02* | (2006.01) |

(52) U.S. Cl.
CPC .......... *G06F 1/1605* (2013.01); *G05B 15/02* (2013.01); *G06F 3/167* (2013.01); *G10L 15/22* (2013.01); *H02K 7/116* (2013.01); *H04R 1/028* (2013.01); *G10L 2015/223* (2013.01); *H04R 2499/15* (2013.01)

(58) Field of Classification Search
CPC ....... G05F 1/1605; G05B 15/02; G06F 3/167; G10L 15/22; G10L 2015/223; H02K 7/116; H04R 1/028; H04R 2499/15
USPC .......................................................... 700/57
See application file for complete search history.

(56) References Cited

U.S. PATENT DOCUMENTS

| | | | | |
|---|---|---|---|---|
| 11,093,132 | B2* | 8/2021 | Seo ..................... | G06F 3/04817 |
| 2012/0149437 | A1* | 6/2012 | Zurek ................. | H04M 1/0266 |
| | | | | 455/566 |
| 2014/0029187 | A1* | 1/2014 | Okuley .................. | G06F 1/166 |
| | | | | 361/679.55 |
| 2016/0094691 | A1* | 3/2016 | Okuley ................. | G06F 1/1632 |
| | | | | 455/575.1 |
| 2018/0129197 | A1* | 5/2018 | Wikander ................ | H04N 5/00 |
| 2020/0319672 | A1* | 10/2020 | Kim ..................... | H04M 1/0268 |

* cited by examiner

*Primary Examiner* — Md Azad
(74) *Attorney, Agent, or Firm* — Hanley, Flight & Zimmerman, LLC

(57) ABSTRACT

Methods, apparatus, systems and articles of manufacture are disclosed for electronic devices having multiple modes of operation. An example electronic device disclosed herein includes a display having a first rigid plate coupled to a first portion of the display, a second rigid plate coupled to a second portion of the display, and a flexible plate coupled to a third portion of the display, the flexible plate positioned between the first rigid plate and the second rigid plate. The device further includes a drive to move the display between a first physical configuration, a second physical configuration and a third physical configuration.

20 Claims, 10 Drawing Sheets

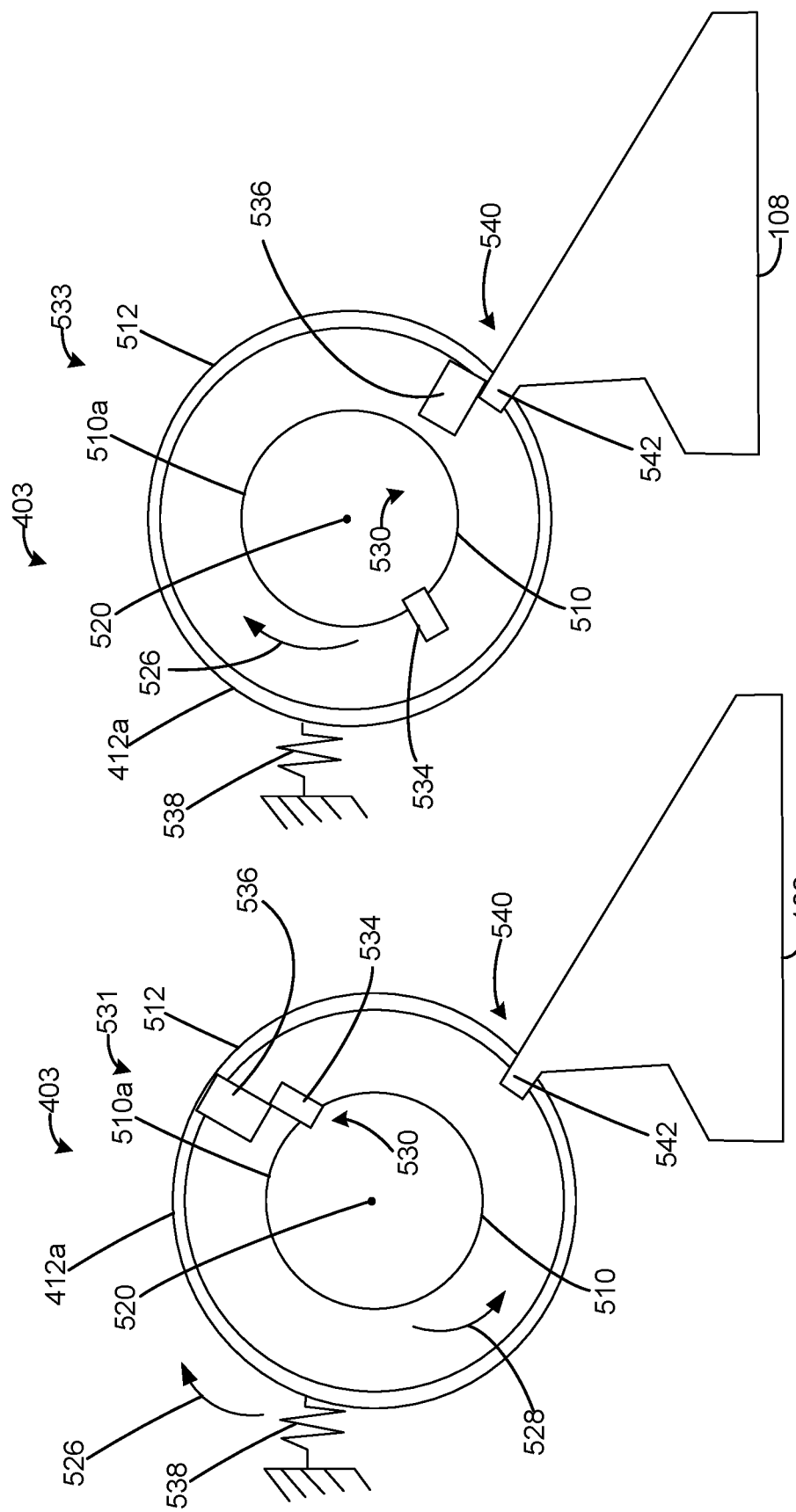

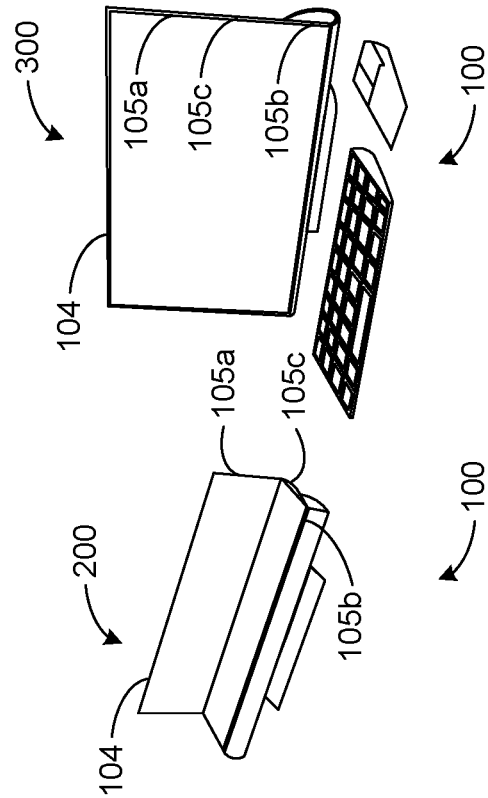
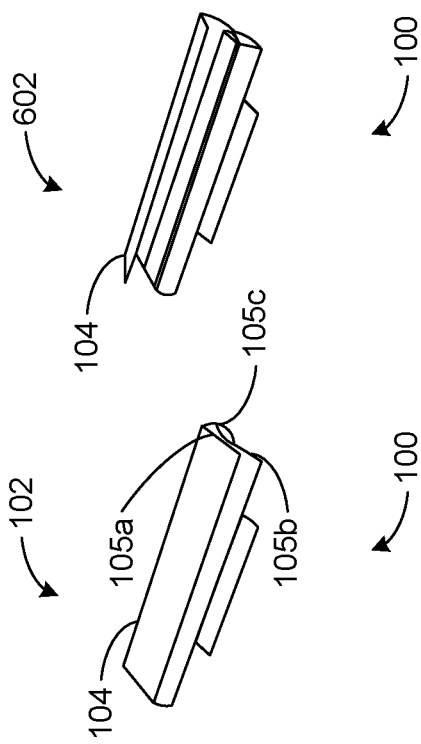

ELECTRONIC DEVICES HAVING MULTIPLE MODES OF OPERATION

FIELD OF THE DISCLOSURE

This disclosure relates generally to electronic devices, and, more particularly, to electronic devices having multiple modes of operation.

BACKGROUND

In recent years, electronic devices (e.g., cellular devices, personal computers, laptops, tablets, etc.) have often included touch-screens. These touch screens enable users of these electronic devices to interact directly with the graphics (e.g., GUIs, icons, etc.) displayed thereon via a user interface. Some electronic device displays include flexible organic light-emitting diodes (flexible OLED) that allow screens to flex and bend without breaking.

BRIEF DESCRIPTION OF THE DRAWINGS

FIG. 5C is an enlarged, schematic end view of a shaft of the example drive system of FIG. 5B.

FIG. 5D is another enlarged, schematic end view of the shaft of the example drive system of FIG. 5C.

FIGS. 6A-6D are perspective views of the example electronic device of FIGS. 1-3 at various stages of transition between the example first configuration and the example third configuration of FIGS. 1-3.

DETAILED DESCRIPTION

Figure 1:
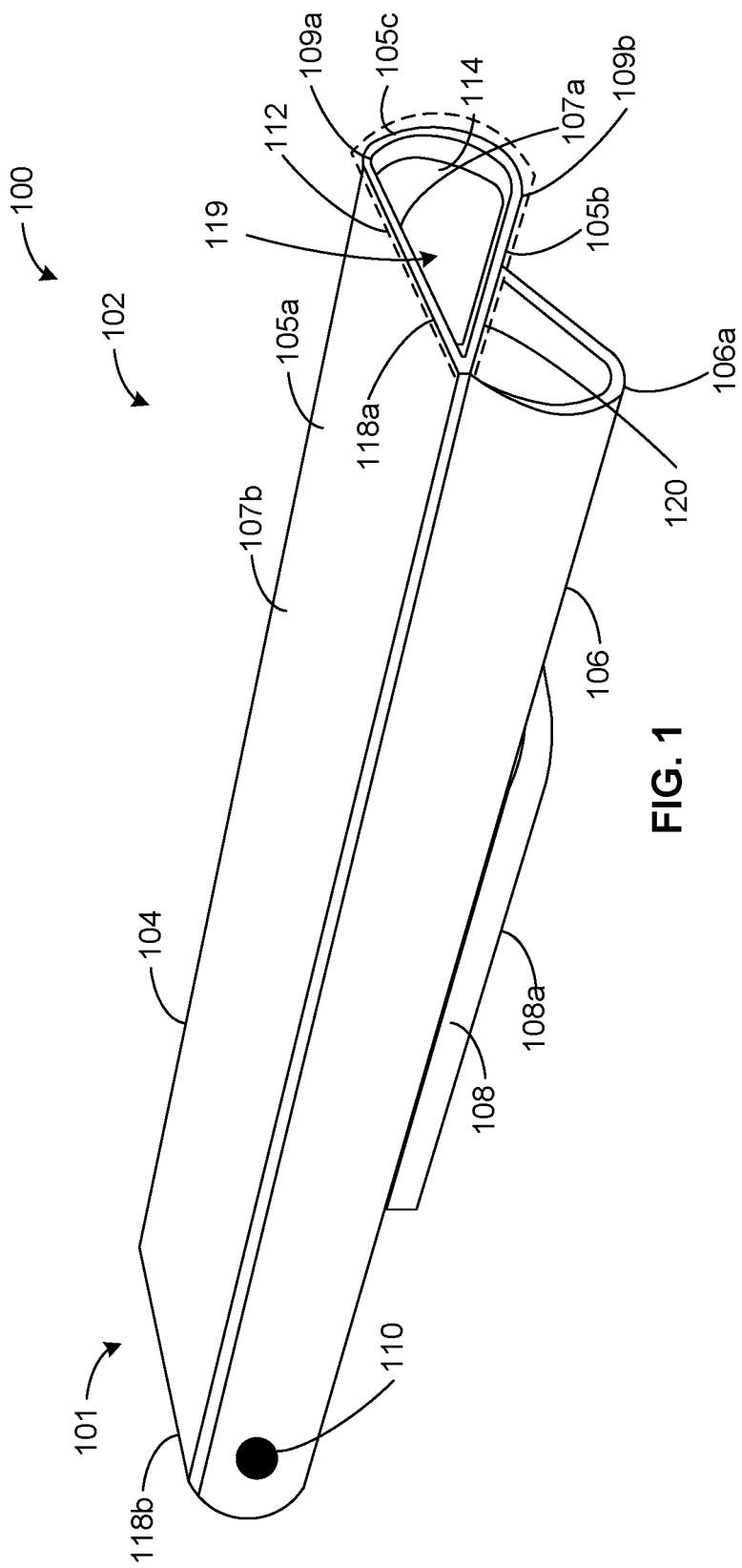
FIG. 1 is a perspective view of an example electronic device constructed in accordance with teachings of this disclosure. The example electronic of FIG. 1 is shown in an example first configuration.

Example devices are disclosed herein can transform between multiple configurations. As used herein, "a configuration" refers to a particular physical arrangement of parts and/or features of a device. As used herein, the "position" of a part refers to the physical location and/or orientation of said part. A configuration may additionally be described with reference to the relationship between parts of the device. As used herein, a "mode of operation" refers to functions associated with an electronic device. An example electronic device can have multiple modes of operation. Some or all of the modes of operation may be employed when device is in a specific corresponding configuration. Other modes of operation may be available in more than one configuration of the electronic device.

In some examples used herein, directional descriptors are used to describe the orientation and/or positions of parts. As used herein, the term "vertical" is used to describe the direction perpendicular to the ground (e.g., relative to the Earth, etc.). As used herein, the term "lateral" is used to describe the direction along the length of the display and/or screen described in conjunction with the example. As used herein, the term "horizontal" is used to describe the direction perpendicular to the vertical and lateral directions. Thus, the terms vertical, horizontal, and lateral refers to an X, Y, Z coordinate system where the vertical axis is defined relative to the Earth. It will be assumed the electronic device's position is in alignment with the X, Y, Z coordinate system for ease of explanation, but the electronic device may be in any other position relative to the Earth. As used herein, the term "downward" is used to describe directions generally towards the ground and the term "upward" is used to describe directions generally away from the ground.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used in, for example, a preamble of a claim, it is to emphasize the claim is open-ended in the same manner as the term "comprising" and "including" identify an open ended term or claim. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these features may possibly be combined, and the inclusion in different examples or claims does not imply that a combination of features is not feasible and/or advantageous. All such configurations are contemplated.

Electronic devices such as, for example, smart phones, personal computers, smart home devices, tablets, IoT devices, smart speakers, etc., perform different functions. Presently, such known electronic devices are manufactured with different form factors. Such known electronic devices typically cannot transform between three or more physical configurations.

Example electronic devices disclosed herein can transform between a two or more physical configurations. In some examples, different ones of the physical configurations correspond to different modes of operation. Some examples electronic devices disclosed herein can transform between a first mode of operation (e.g., an ambient mode), a second mode of operation (e.g., a smart home dashboard), and/or a third mode operation (e.g., a personal computer). For instance, some example electronic devices disclosed herein are structured to transform between a personal computers (PC) configuration, a home hub configuration, a speaker configuration, etc. In some examples, electronic devices disclosed herein can operation in an ambient mode to enable use of the electronic device as a smart speaker, in a smart hub mode to enable use of the electronic device as a smart hub dashboard, and in a PC mode to enable operation of the electronic device as a personal computer. To this end, the electronic devices disclosed herein have a changeable form factor that allows transformation into configuration(s) associated with tone two or more different modes of operations. For example, some electronic devices disclosed herein can transform between a first configuration (e.g., a first physical configuration) to enable the electronic device to be used use as a speaker, a second configuration (e.g., a second physical configuration) to enable the electronic device to be used as a hub, and a third configuration (e.g., a third physical configuration) to enable the electronic device to be used as a personal computer. To enable transformation between the various configurations, example electronic devices disclosed herein include a flexible display and a mechanical drive system to articulate the flexible display. However, in some examples, example electronic devices can be manually manipulated to transform between the two or more configurations without use of an electric or automated drive system (e.g., via a non-powered, mechanical transmission such as a crank, a slide, or the like and/or via a direct human interaction such as gripping, grasping, pulling, etc.).

FIG. 1 is a perspective view of an example electronic device 100 constructed in accordance with teachings of the disclosure. The example electronic device 100 of FIG. 1 is shown in an example first configuration 102. In some examples, the example first configuration 102 can be referred to as a stowed configuration, an ambient configuration, a smart speaker configuration, and/or a speaker configuration. For example, the electronic device 100 of FIG. 1 has a mode of operation associated with a smart speaker. The electronic device 100 of the illustrated example of FIG. 1 includes an example display 104, an example speaker assembly 106, an example base 108, and an example microphone 110. As shown in FIG. 1, the display 104 is shown in a first display position 101 (e.g., a stowed display position, etc.). As used herein, a "display position" refers to the physical configuration of the display 104.

The display 104 of the illustrated example presents a graphical user interface (GUI). Specifically, the display 104 of the illustrated example includes a front surface 107a (e.g., a screen) that presents the GUI and a rear surface 107b opposite the front surface 107a. In the illustrated example of FIG. 1, the display 104 is a flexible display. The example display 104 can be implemented by a flexible active-matrix organic light-emitting diode (AMOLED), a flexible organic light-emitting diode (OLED), a flexible liquid-crystal display (LCD), and/or any other flexible or bendable display or screen. In some examples, the display 104 can be a touch screen. In such examples, the display 104 can include touch sensors that enable the screen to detect touch inputs/commands from a user.

In the illustrated example of FIG. 1, the display 104 has an example first portion 105a (e.g., an upper portion), an example second portion 105b (e.g., a lower portion), and an example third portion 105c (e.g., a midportion). The portions 105a, 105b, 105c of the illustrated example extend along a length of the display 104 between an example first lateral edge 118a (e.g., a right-side edge in the orientation of FIG. 1) and a second lateral edge 118b (e.g., a left-side edge in the orientation of FIG. 1) opposite the first lateral edge 118a. The portions 105a, 105b, and 105c, together, comprise the entirety of the display 104. The third portion 105c of the illustrated example is positioned between the first portion 105a and the second portion 105b. The third portion 105c of the illustrated example includes a first section 109a abutting the first portion 105a and a second section 109h abutting the second portion 105h. The first section 109a and the second section 109b and are integral with the third portion 105c. In other words, the first section 109a joins or couples to the first portion 105a and the second section 109b joins or couples to the second portion 105b. The first portion 105a and the second portion 105b of the illustrated example each have a substantially flat profile (e.g., a non-curved, planar, or straight shape) and the third portion 105c has a substantially a curved or arcuate profile.

When the display 104 of the illustrated example is in the first display position 101, the display 104 exhibits a first end profile 112 represented by a dashed line in FIG. 1. The first end profile 112 of the illustrated example is a teardrop-shape. In the first display position 101, the first portion 105a of the display 104 is substantially parallel (e.g., orthogonal or horizontal) to a bottom surface 108a of the base 108 and the second portion 105b of the display 104 is oriented at an angle relative to horizontal (e.g., a downwardly sloping angle, etc.). For example, the second portion 105b (e.g., the front surface 107a of the second portion 105b) of the display 104 has a sloping surface relative to the base 108 of the electronic device 100. The third portion 105c of the display has a curved or arcuate shape that projects outwardly from the first portion 105a and the second portion 105b in a direction away from the speaker assembly 106. In the illustrated example of FIG. 1, the curved profile of the third portion 105c of FIG. 1 has a bend radius of between approximately 4 millimeters (mm) and 6 millimeters (mm) (e.g., 5 mm) and has a bend angle of between approximate 20 degrees and 40 degrees (e.g., e.g., 30 degrees). In other examples, the curved surface of the third portion 105c can have any other suitable curvature, bend radius and/or bend angle depending on the size of the display 104 (e.g., a bend radius of 10 mm, a bend radius of 25 mm, a bend radius of 50 mm, etc.). In some examples, the curved profile of the third portion 105c can have a circular shape, an elliptical shape, and/or any other suitable shape.

In the illustrated example of FIG. 1, the display 104 defines an enclosed profile forming an example cavity 114 when the display 104 is in the first display position 101. In other words, an enclosed profile is provided because the front surface 107a of the display 104 (e.g., the screen) is hidden from view. For example, the front surface 107a of the first portion 105a, the second portion 105h and the third portion 105c of the display 104 define (e.g., fold together to form) the cavity 114 when the display 104 is in the first display position 101 as shown in FIG. 1. Thus, the cavity 114 is a partially enclosed space defined by the first end profile 112 of the display 104. The cavity 114 defined by the display 104 can provide a storage area to stow one or more accessories associated with the electronic device 100 when the electronic device 100 is in the first configuration 102 of FIG. 1 and/or a second configuration 200 of FIG. 2.

In the illustrated example of FIG. 1, the cavity 114 has the same cross-sectional shape as the first end profile 112 and extends between the first lateral edge 118a and an example second lateral edge 118b of the display 104. In some examples, one or more accessories 119 for the electronic device 100 can be stored within the cavity 114 when the electronic device 100 is in the first configuration 102. In other words, the display 104 wraps around the accessories 119. For example, the front surface 107a engages and/or wraps around the accessories 119 when the display 104 is in the first display position 101. To facilitate storing the accessories 119 in the cavity 114, the accessories 119 can be shaped similar or complementary to a profile of the cavity 114. For example, the accessories 119 or a container containing the accessories 119 can have a profile complementary to the first end profile 112 defined by the first portion 105a, the second portion 105b, and the third portion 105c when the display 104 is in the first display position 101. As used herein, parts or components are "complementary" if they have substantially the same shape and/or have sizes to facilitate engagement. Example accessories 119 for the electronic device 100 are described in connection with FIGS. 3, 7A, and 7B below. In some examples, the accessories 119 are not positioned in the cavity 114.

The speaker assembly 106 includes one or more speakers (e.g., audio output devices, etc.) that enable the electronic device 100 to output audio (e.g., music, a podcast, radio, associated with GUI displayed on the display 104, etc.). In the illustrated example of FIG. 1, the speaker assembly 106 carries or otherwise supports the speakers (e.g., and/or other electronic components). In such examples, the speaker assembly 106 is coupled to the rear surface 107b of the display 104. In particular, the speaker assembly 106 is attached to the rear surface 107b defined by the second portion 105b of the display 104. In the illustrated example of FIG. 1, the speaker assembly 106 has an arcuate profile that protrudes from a lower edge 120 (e.g., a bottom edge of the display in the orientation of FIG. 1).

The speaker assembly 106 of the illustrated example of FIG. 1 has a shape (e.g., a cross-sectional shape or profile) that is substantially similar (e.g., the same shape) to the first end profile 112 of the display 104 when the display 104 is in the first display position 101. For example, the speaker assembly 106 has a teardrop-shape. However, an arcuate shape 106a of the speaker assembly 106 protrudes in a direction away from the third portion 105c of the display 104. Thus, the speaker assembly 106 has a profile that is substantially a mirror image of the first end profile 112 formed by the display 104 when the display 104 is in the first display position 101 of FIG. 1. In other examples, the speaker assembly 106 can have any other suitable shape. For example, the speaker assembly 106 can be semicircular, semielliptical, rectangular, triangular, etc. Additionally, the speaker assembly 106 of the illustrated example extends between the first lateral edge 118a and the second lateral edge 118b. In the examples disclosed herein, the speaker assembly 106 does not change shape (i.e., does not transform to a different configuration) when the electronic device 100 changes configurations. In other examples, however, the speaker assembly 106 can change (e.g., transform to a different shape) in response to the electronic device 100 changing its configuration. When the electronic device 100 is in the first configuration 102 the second portion 105h is not oriented in the vertical plane and, thus, the speaker assembly 106 is oriented forward, which improves audio output (e.g., by increasing the audible distance of audio output by the electronic device 100, etc.).

The base 108 provides a stand for the display 104. Additionally, the display 104 is rotatably coupled to the base 108 to enable rotation of the display 104 relative to the base 108. In the illustrated example of FIG. 1, the base 108 is substantially centered relative to the speaker assembly 106 and the display 104. For example, the base 108 is centrally located between the first and second lateral edges 118a, 118b. The example base 108 can be composed of a metal, a plastic, a ceramic, and/or a combination thereof.

The microphone 110 is a transducer that converts sound waves into an audio signal. In some examples, the microphone 110 can be used transceiver sound waves which may include audio commands directed to the electronic device 100. In the illustrated example of FIG. 1, the microphone 110 is supported by (e.g., is positioned within) the speaker assembly 106. In some examples, the microphone 110 can be coupled at other suitable position(s) in/on the electronic device 100. For example, the microphone 110 can be incorporated into the base 108, the display 104 (e.g., a bezel of the display 104, etc.), etc. In some examples, the microphone 110 can be implemented by a separate device coupled to and/or in communication with the electronic device 100 (e.g., via a wired connection, via a wireless connection, etc.). In some examples, the microphone 110 is one of several microphones. In such examples, the microphone(s) can be implemented via a microphone array including multiple transducers. The example electronic device 100 can include features not illustrated in FIG. 1. For example, the electronic device 100 can include buttons (e.g., virtual, physical, etc.) disposed on the speaker assembly 106, the base 108, the rear surface 107b of the display 104, etc. In such examples, the electronic device 100 can directly receive commands (e.g., volume control, configuration transition control, etc.) via the buttons. The example electronic device 100 can also include one or more transceivers (e.g., shortwave, cellular, Wi-Fi, etc.) than enables the electronic device 100 to communicate with other devices (e.g., a mobile device associated with a user, etc.) and/or accessories.

Figure 2:
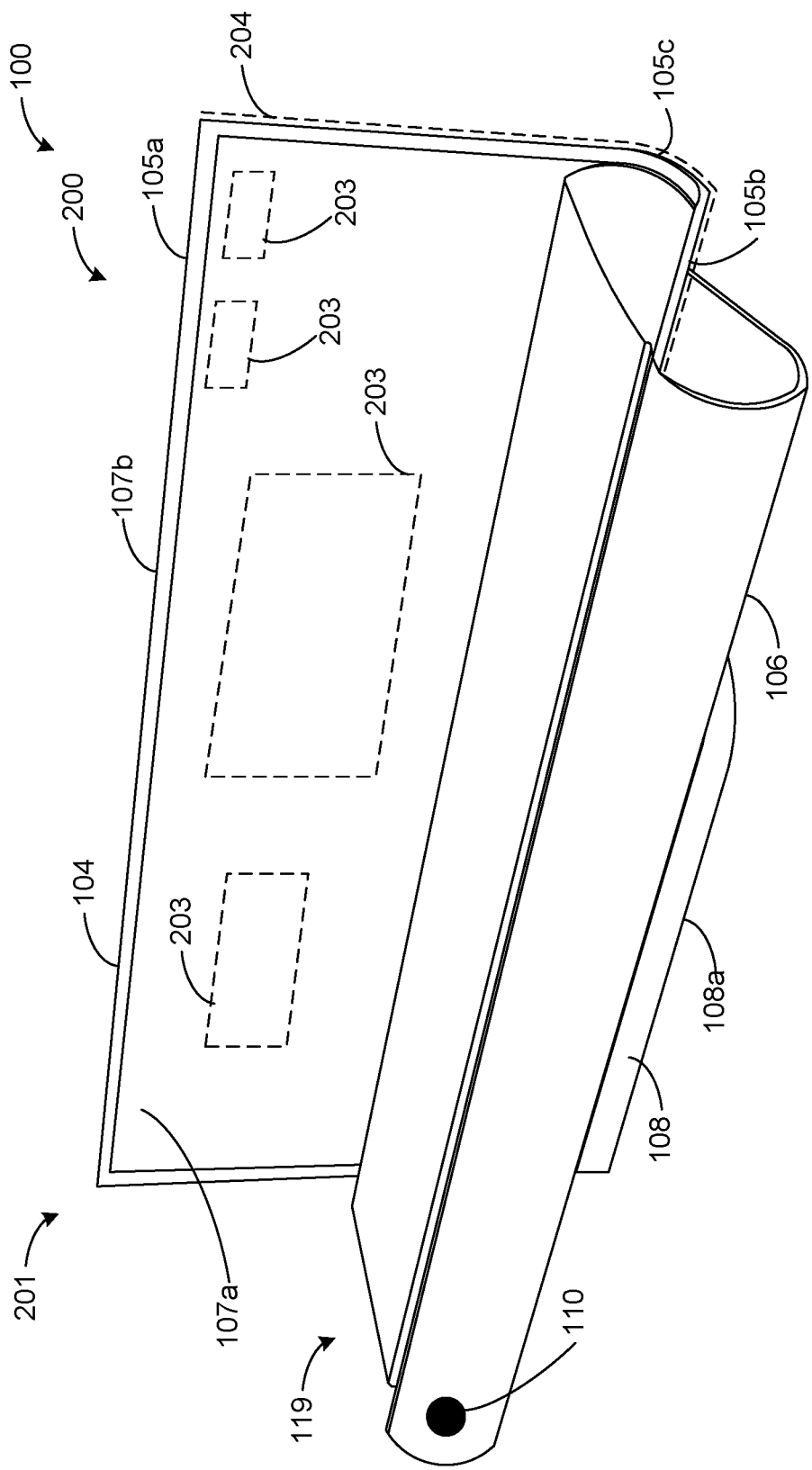
FIG. 2 is a perspective view of the example electronic device display of FIG. 1 shown in an example second configuration.

FIG. 2 is perspective view of the electronic device 100 of FIG. 1 in an example second configuration 200. In this example, the electronic device 100 has transformed from the first configuration 102 of FIG. 1 to the second configuration 200 of FIG. 2. In some examples, the example second configuration 200 can be referred to as a "partial display configuration," a "dashboard configuration" and/or a "clock configuration" and/or a "hub configuration." For example, in the second configuration 200 the electronic device 100 of FIG. 1 is able to function as a clock, dashboard, and/or hub.

In the second configuration 200, the display 104 is positioned in a second display position 201. For example, in the second display position 201, the first portion 105a has moved from an orientation shown in FIG. 1 to an orientation shown in FIG. 2. In the second display position 201, at least a portion of the front surface 107a is exposed or viewable. Specifically, the front surface 107a of the first portion 105a of the display 104 is exposed and/or is in a viewable position. In the second display position 201, the display 104 can output a graphic user interface (GUI) 203 via the first portion 105a. In some examples, the GUI 203 output by the display 104 outputs or presents a dashboard GUI. As used herein, a "dashboard" GUI refers to a GUI that includes summary information such as a date, time, ambient conditions (e.g., temperature, weather forecasts, humidity), calendar information (e.g., detail about outcoming appointments of the user, etc.), device information (e.g., battery charge, connected devices, etc.), information regarding the currently playing audio (e.g., track information, duration, playback location, etc.), and/or any other indicia, symbol, text that conveys information (e.g., to a user). In some examples, the GUI 203 may be implemented by a personal assistant GUI.

In the second display position 201, the display 104 forms a second end profile 204 that is different than the first end profile 112 of FIG. 1. For example, the first portion 105a of the display 104 of the illustrated example is oriented in non-parallel position (e.g., a perpendicular position) relative to the bottom surface 108a of the base 108 (e.g., relative to horizontal). That is, the first portion 105a of the display 104 has transitioned from a substantially horizontal orientation in first configuration 102 to a substantially vertical configuration in the second configuration 200. However, in the illustrated example of FIG. 2, an orientation or position of the second portion 105h does not change (e.g., is in the sample position) compared to the orientation or position of the second portion 105b shown in FIG. 1. In other words, when the display 104 is in the second display position 201 of FIG. 2, the second portion 105b has a sloping orientation similar to the sloping profile (e.g., end profile) when the display 104 is in the first display position 101 of FIG. 1. Thus, a position of the speaker assembly 106 does not change. Thus, when the electronic device 100 is in the second configuration 200, the speaker assembly 106 is oriented forwarded, which increases the audible distance of audio output by the electronic device 100.

The third portion 105c is a hinged or flexible portion, which enables the first portion 105a to be rotated relative to the second portion 105b. As used herein, the term "hinged" refers to a non-rigid structure that may bend, flex, or elastically deform (e.g., when exposed to mechanical stimuli). Hinged portions may be implemented by an elastic structure, a single hinge (e.g., a piano hinge, etc.), multiple hinges (e.g., multiple piano hinges, a chain, a watchband structure, etc.). To enable the first portion 105a to move and maintain the position of the second portion 105b when the display 104 moves to the second display position 201, the first section 109a of the third portion 105c coupled to the first portion 105a flexes or moves relative to the second section 109b of the third portion 105c that is coupled to the second portion 105b. In particular, the first section 109a has a straight profile and the second section 109b of the third portion 105c has a curved profile. For example, the third portion 105c allows the first portion 105a to move relative to the second portion 105b and restricts the second portion 105h from moving in response to the display 104 moving to the second display position 201.

The second end profile 204 corresponding to a cross-sectional shape of the display 104 when the electronic device 100 is in the second configuration 200. The second end profile 204 is represented by a dashed line. In the illustrated example of FIG. 2, the second end profile 204 is defined by an orientation (e.g., a vertical orientation) of the first portion 105a, an orientation (e.g., a vertical orientation) of the first section 109a of the third portion 105c, an orientation (e.g., a curved profile) of the second section 109b of the third portion 105c, and an orientation (e.g., a tapered or angled orientation) of the second portion 105h. Thus, the curvature of the third portion 105c changes to enable movement of the first portion 105a relative to the second portion 105b (e.g., to move the first portion 105a in a vertical orientation as shown in FIG. 2). When the display 104 is in the second display position 201, the accessories 119 stored within the display 104 (e.g., within the cavity 114 of FIG. 1) are accessible. In the illustrated example of FIG. 2, the accessories 119 are positioned on at least the second portion 105b of display 104.

Figure 3:
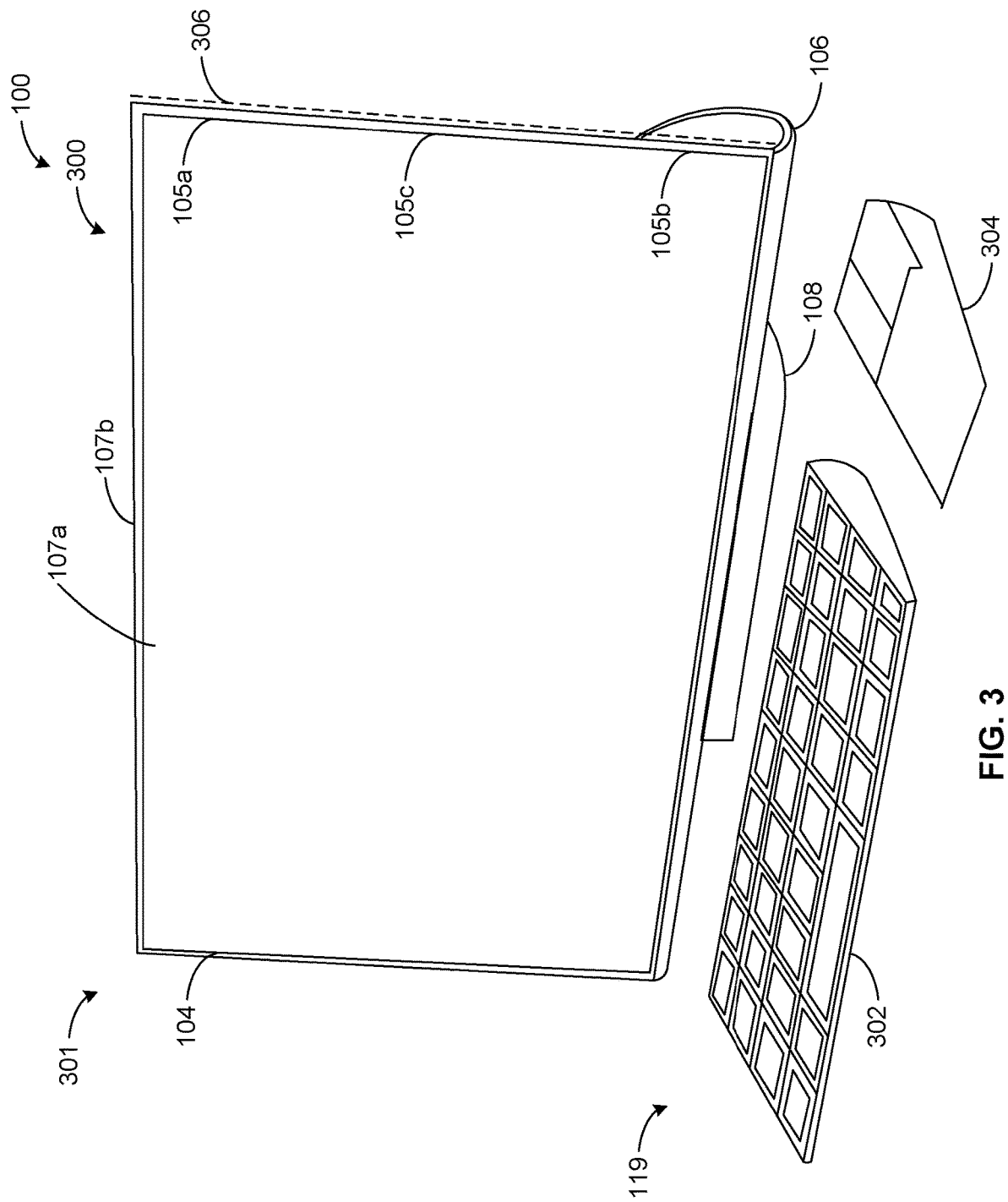
FIG. 3 is a perspective view of the example electronic device of FIGS. 1 and 2 shown in an example third configuration.

FIG. 3 illustrates the electronic device 100 of FIGS. 1 and 2 in an example third configuration 300. In the illustrated example of FIG. 3, the display 104 has an example third end profile 306 represented by a dashed line. In some examples, the example second configuration 200 can be referred to as an "all-in-one personal computer (PC) configuration," a "PC configuration," a "deployed configuration," a "tablet," and/ or a "television configuration."

In the third configuration 300, the display 104 is positioned in a third display position 301. For example, in the third display position 301, the portions 105b, 105c have moved from the orientations shown in FIG. 2 to the orientations shown in FIG. 3. In the third display position 301, the entirety of the front surface 107a of the display 104 is exposed and/or is in a viewable position. In other words, in the third display position 301, the display 104 can output a GUI via all or some of the portions 105a, 105b, 105c when the electronic device 100 is in the third configuration 300.

In the third display position 301, the display 104 forms a third end profile 306 (representative of a cross-sectional shape of the display 104) that is different than the first end profile 112 of FIG. 1 and the second end profile 204 of FIG. 2. In the illustrated example of FIG. 3, the portions 105a, 105h, 105c of the display 104 are each in a substantially vertical orientation. That is, the second portion 105h moves from a sloping position or orientation to a substantially vertical position and the third portion 105c moves from a curved orientation to a substantially vertical position. The third portion 105c moves from the orientation or position of FIG. 2 to a substantially planar and vertical orientation or position of FIG. 3. However, in the illustrated example of FIG. 3, an orientation or position of the first portion 105a does not change compared to the orientation or position of the first portion 105a shown in FIGS. 1 and 2. In other examples, the display 104 can have an angular displacement from the vertical plane (e.g., 5 degrees, 10 degrees, etc.) clockwise or counterclockwise. In other examples, the portions 105a, 105b, 105c of the display 104 are not planar. In such examples, some or all of the portions 105a, 105b, 105c can have a non-colinear relationship.

In the illustrated example of FIG. 3, the accessories 119 are removed from the display 104. For example, the accessories 119 of the illustrated example include an example keyboard 302 and an example mouse 304. The keyboard 302 and the mouse 304 correspond to the accessories 202 of FIG. 2 and are stowed in the cavity 114 of FIG. 1 when the electronic device 100 is in the first configuration 102 and in the space defined by the second end profile 204 of FIG. 2 when the electronic device 100 is in the second configuration 200 of FIG. 2. In the illustrated example of FIG. 3, the keyboard 302 and mouse 304 are wirelessly connected (e.g., via shortwave, via W-Fi, etc.) to the electronic device 100. In other examples, the keyboard 302 and/or mouse 304 can be connected to the electronic device 100 by any other suitable means (e.g., a wired-connected, etc.). In some examples, to facilitate the storage of the keyboard 302 and the mouse 304 in the electronic device 100 when the electronic device 100 is in the first configuration 102 and/or second configuration 200, the keyboard 302 and/or the mouse 304 include means to couple the keyboard 302 to the mouse 304 when in storage. For example, the keyboard 302 and/or mouse 304 can include a magnet, a mechanical coupling (e.g., a rail and slide, etc.), a hook and loop fastener, and/or any other suitable fastener(s), etc. In other examples, the keyboard 302 and/or mouse 304 do not include a means to couple them together.

In the illustrated example of FIG. 3, when the electronic device 100 is in the third configuration 300, the speaker assembly 106 is oriented downward, which improves the audio quality of the audio output by the electronic device 100. In some examples, the electronic device 100 can transition from the third configuration to other configurations (e.g., to the second configuration, etc.) when a user inputs a command (e.g., a vocal command, a command from a mobile device, a push-button command, etc.) to transitioned to another configuration.

Figure 4:
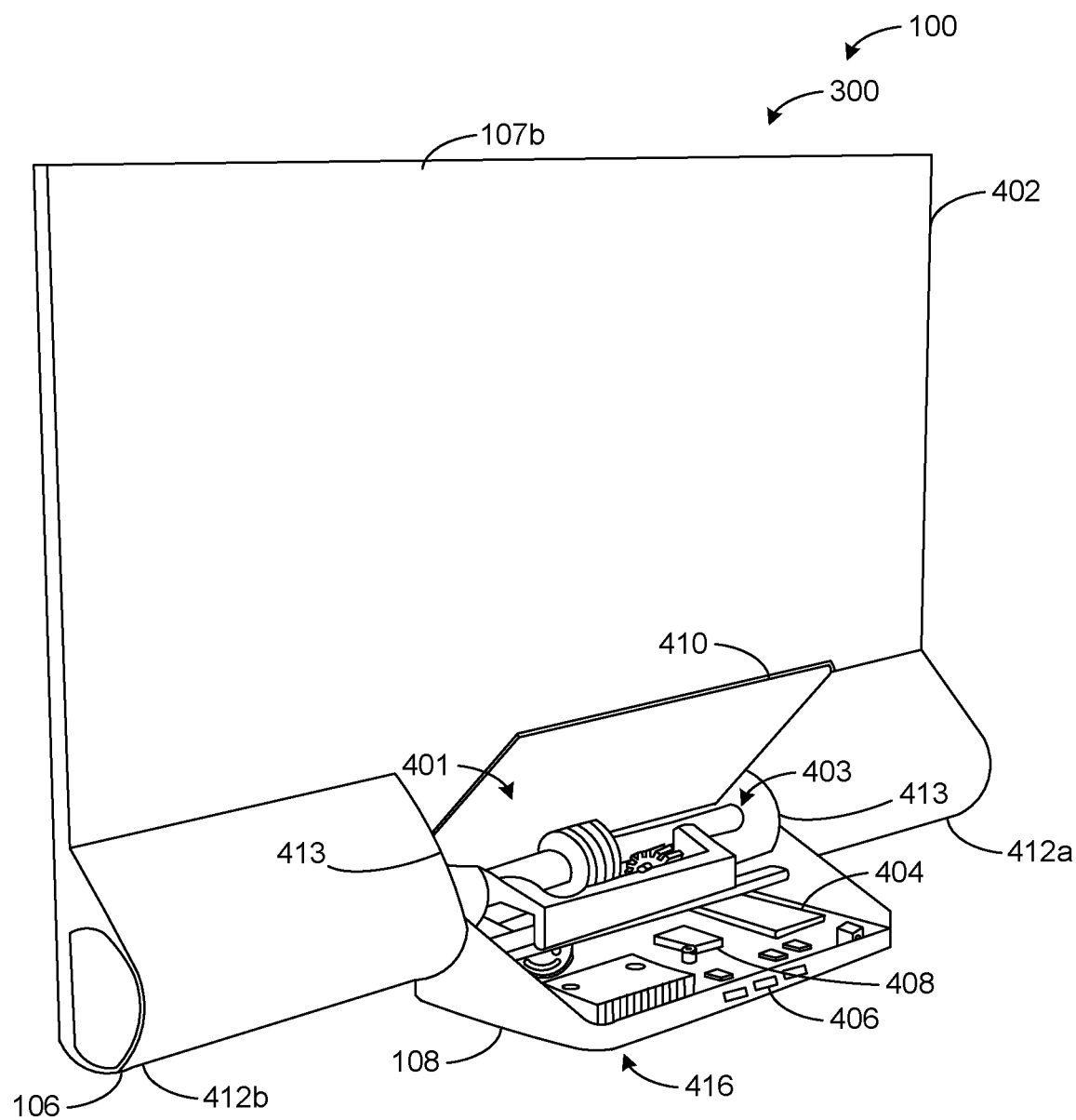
FIG. 4 is a rear, perspective view of the example electronic device of FIGS. 1-3.

FIG. 4 is a rear, perspective view of the electronic device 100 of FIGS. 1-3. In the illustrated example of FIG. 4, the electronic device 100 is in the third configuration 300 of FIG. 3. In the illustrated example of FIG. 4, a cover 402 covers (e.g., overlays) the back 107b of the display 104. For example, the back cover 402 can be a flexible silicon cover. In other examples, the back cover 402 can be composed of any other suitable material (e.g., vinyl, plastic, aluminum, etc.) and/or a combination of materials. In some examples, the back cover 402 is coupled to the back 107b of the display 104 via a snap-fit connection. In other examples, the back cover 402 can be coupled to the display 104 via a mechanical fastener, a chemical fastener (e.g., adhesive) and/or any other fastener(s).

As shown in FIG. 4, the base 108 of the illustrated example is positioned between a first speaker housing 412a of the speaker assembly 106 and a second speaker housing 412b of the speaker assembly 106. The base 108 is also positioned below the second portion 105h. The base 108 of the illustrated example defines a cavity 416 to house or contain one or more internal components 401 of the electronic device 100. For example, the internal components include an example drive system 403, an example processor 404, an example interface 406, and an example memory 408. The internal components 401 can include additional elements not illustrated in FIG. 4. For example, the internal components 401 can include one or more batteries (e.g., to power the electronic device 100, etc.), additional computer elements, etc.

To access to the cavity 416, the base 108 of the illustrated example includes a rear access panel 410. The rear access panel 410 of the illustrated example is shown in an open position and positioned between respective inner ends 413 of the first speaker housing 412a and the second speaker housing 412b. The rear access panel 410 can be removably coupled to the base 108. In the illustrated example of FIG. 4, the rear access panel 410 is hinged at an upper portion (e.g., a top portion) of the base 108. In other examples, the rear access panel 410 can be hinged at a bottom of the base 108. Additionally or alternatively, the rear access panel 410 can be coupled to the base 108 via one or more fasteners (e.g., screws, nuts, etc.). In a closed position, the rear access panel 410 covers or restricts access to the cavity 416 and covers the internal components 401 of the electronic device 100 that are positioned in the base 108.

To transform between the different configurations 102, 200 and 300 of FIGS. 1-3, the electronic device 100 includes the drive system 403. For example, the example drive system 403 transforms the electronic device 100 between the first configuration 102 of FIG. 1, the second configuration 200 of FIG. 2 and the third configuration 300 of FIG. 3. To transform the electronic device 100 between the different configurations, the drive system 403 articulates or moves the display 104 between the first display position 101, the second display position 201 and the third display position 301. An example implementation of the drive system 403 is described below in conjunction with FIG. 5B.

The example processor 404 executes machine readable instructions (e.g., the process 800 of FIG. 8, the machine readable instructions 932 of FIG. 9, etc.) to operate the electronic device 100. For example, the processor 404 can execute instructions to cause the drive system 403 to move the electronic device 100 into a configuration (e.g., the configurations 102, 200, or 300) in response to a user command (e.g., a vocal command, etc.). In some examples, the processor 404 executes machine readable instructions to cause the speaker assembly 106 to output audio in response to a user command. In some examples, the processor 404 executes machine readable instructions to cause the display 104 to present the GUI 203 in response to a user command. While only a single processor 404 is illustrated in FIG. 4, the electronic device 100 can include any number and/or type of processors. For example, the electronic device 100 can include additional processors (e.g., graphical processor units, sound processor units, etc.) to enable the display to act as a personal comput s a speaker, etc. An example implementation of the processor 404 and the memory 408 is described below in connection with FIG. 9.

The interface 406 allows the display 104 to interface with other devices and/or connect to a power source. For example, the interface 406 can include one or more universal serial bus (USB) ports, one or more high-definition multimedia interface (HDMI) ports, one or more audio input/output ports, one or more power supply ports, etc. In some examples, the interface 406 can include additional internal elements. For example, the interface 406 can include a Wi-Fi card, a Bluetooth (BLE) card, etc.

Figure 5B:
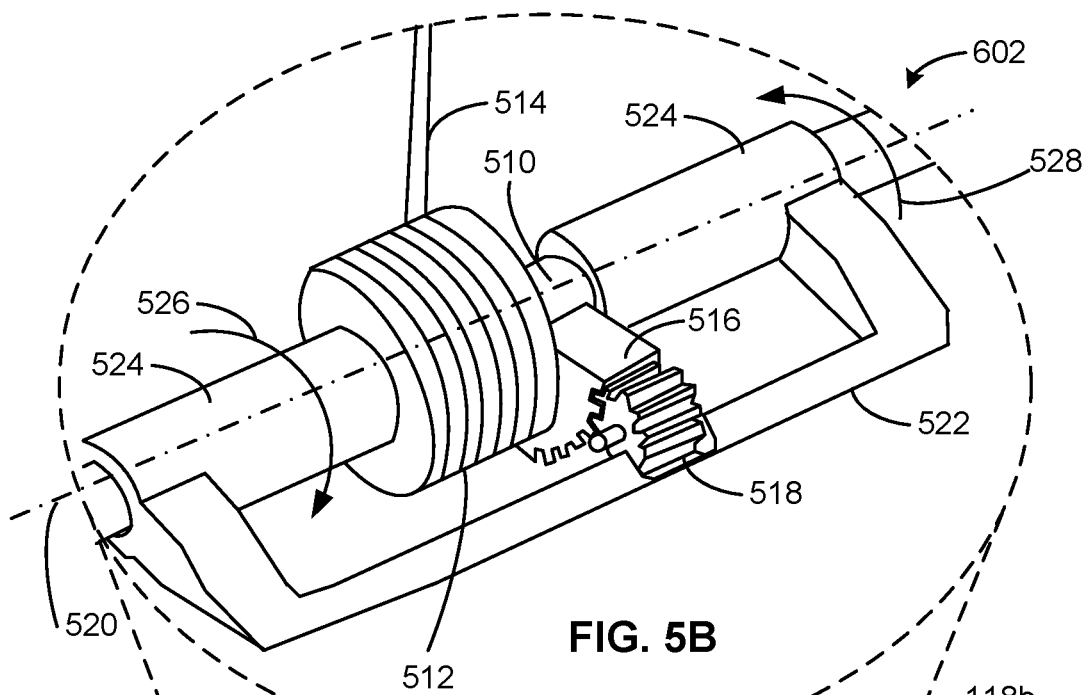
FIG. 5B is an enlarged, partial view of an example drive system of the example electronic device of FIGS. 1-4, and 5A.
Figure 5A:
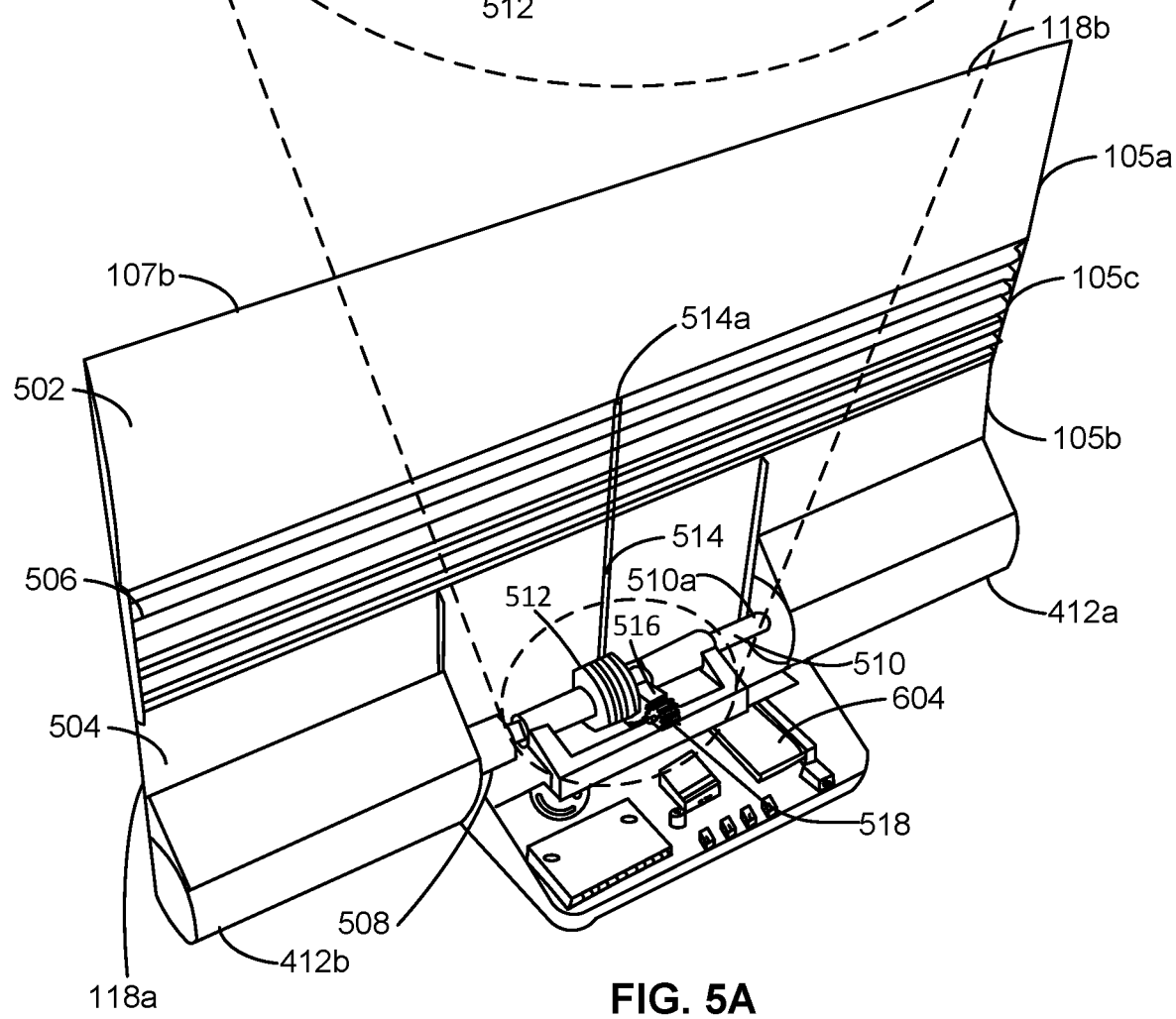
FIG. 5A is another rear, perspective view of the example electronic device of FIGS. 1-4.

FIG. 5A is a rear, perspective view of the electronic device 100 of FIG. 4. In the illustrated example of FIG. 5A, the back cover 402 of the display 104 is removed. Specifically, to enable the display 104 to move between the first display position 101, the second display position 201 and the third display position 301 via the drive system 403, the display 104 of the illustrated example includes a first rigid backing or plate 502, a second rigid backing or plate 504, and a flexible backing or plate 506. For example, the first rigid plate 502 supports the first portion 105a of the display 104, the second rigid plate 504 supports the second portion 105b of the display 104, and the flexible plate 506 supports the third portion 105c of the display 104. The rigid plates 502, 504 are rigid structures that couple to the respective first portion 105a and the second portion 105b to prevent and/or restrict the first portion 105a of the display 104 and the second portion 105b of the display 104 from bending (e.g., forming arcuate profiles) when the electronic device 100 transforms between the first configuration 102, the second configuration 200, and the third configuration 300. In other words, the first lateral edge 118a and the second lateral edge 118b of the display 104 defined by the first portion 105a and the second portion 105b remain substantially straight or planar when the display 104 moves between the first display position 101, the second display position 201 and the third display position 301. In contrast, the first lateral edge 118a and the second lateral edge 118b of the display 104 defined by the third portion 105c can have a substantially curved profile, a substantially straight profile and/or a combination of a curved profile and a straight profile when the display 104 moves between the first display position 101, the second display position 201 and the third display position 301. As such, during the operation of the drive system 403, only the third portion 105c of the display 104 is configured or structured to bend (e.g., move from a curved shape of the first configuration 102 and the second configuration 200 to the straight shape (e.g., vertical shape) of the third configuration 300, etc.). The rigid plates 502, 504 can be composed of aluminum, a plastic, and/or any suitable material or a combination thereof. The rigid plates 502, 504 and the flexible plate 506 can couple to the respective, first portion 105a, the second portion 105b and the third portion 105c of the display 104 via mechanical fastener(s) (e.g., pins, rivets, screws, etc.), adhesive and/or any other chemical fastener(s).

FIG. 5B is an enlarged, partial view of an example drive system 403 of FIG. 5A. Referring to FIGS. 5A-5D, the drive system 403 includes an example motor 508, an example shaft 510, an example spool 512, an example cable 514, an example rotating gear 516, and an example fixed gear 518. The shaft 510 of the illustrated example is operably coupled to the motor 508 and rotates about a longitudinal axis 520 via the motor 508. The shaft 510 of the illustrated example is supported by the first speaker housing 412a and the second speaker housing 412b of the electronic device 100. The shaft 510 can be composed of aluminum, a plastic, etc.

The cable 514 extends along the back 107a of the display 104. Specifically, the cable 506 has an end 514a that is coupled (e.g., fixed or attached) to the rear surface 107b of the first portion 105a of the display 104. The cable 514 is configured to coil and/or uncoil about the spool 512, which varies (e.g., increased or decreases) a tension of the cable 514 to control a position of the first portion 105a of the display 104. For example, the cable 514 causes the first portion 105a of the display to move between the first display position 101 and the second display position 201, The cable 514 can be a wire, a rope, etc., and/or can be composed of aluminum, a rubber, a plastic, etc. In other examples, the cable 514 can be sufficiently rigid and configured to convey compression forces.

The rotating gear 516 is coupled to the shaft 510. For example, the rotating gear 516 is fixed to the shaft 510 and rotates about the longitudinal axis 520 when the motor 508 rotates the shaft 510 in a first rotational direction 526 (e.g., a clockwise direction in the orientation of FIG. 5A) and a second rotational direction 528 (e.g., a counterclockwise direction in the orientation of FIG. 5B) opposite the first rotational direction 526. The fixed gear 518 is fixed to the base 108 via a brace 522. In other words, the fixed gear 518 does not rotate relative to the rotating gear 516. The brace 522 includes spindles that receive the shaft 510. However, the brace 522 (e.g., the spindles 524) do not rotate relative to the base 108 and/or the shaft 510. Thus, the fixed gear 518 is rotatably fixed to the base 108 and/or the rotating gear 516. An interaction between the rotating gear 516 and the fixed gear 518 causes the second portion 105b of the display 104 to move between the second display position 201 and the third display position 301. However, the rotating gear 516 is configured to disengage from the fixed gear 518 when the display 104 moves between the first display position 101 and the second display position 201. For example, the rotating gear 516 is a segment or a partial gear (e.g., a half-gear, a quarter gear, etc.). In other words, the rotating gear 516 is not a circular gear. For example, the rotating gear 516 includes teeth on a portion of the rotating gear 516 (e.g., half of the rotating gear 516, two thirds of the rotating gear 516, a fourth of the rotating gear 516, etc.). As such, the rotating gear 516 only engages the fixed gear 518 at certain rotational or angular orientations of the rotating gear 516. For example, the rotating gear 516 engages the fixed gear 518 about a first angular rotation (e.g., a first ninety-degree rotation) of the shaft 510 and disengages the fixed gear 518 about a second angular rotation (e.g., a second ninety-degree rotation) of the shaft 510.

FIG. 5C is an enlarged, schematic end view of the shaft 510 of the example drive system 403 of FIG. 5B. FIG. 5D is another enlarged, schematic end view of the shaft 510 of the example drive system 403 of FIG. 5B. To selectively couple the shaft 510 and first speaker housing 412a and/or the second speaker housing 412b, the drive system 403 of the illustrated example employs a clutch 530. As shown in FIGS. 5C and 5D, the clutch 530 selectively couples the shaft 510 and the first speaker housing 412a. For example, when the clutch 530 is in an engaged position 531 as shown for example in FIG. 5C, the shaft 510 causes the first speaker housing 412a to rotate about the longitudinal axis 520. When the clutch 530 is in a disengaged position 533 as shown, for example in FIG. 5D the shaft 510 rotates relative to the first speaker housing 412a. In other words, when the clutch 530 is in the disengaged position 533, the first speaker housing 412a and/or the second speaker housing 412b cannot rotate about the longitudinal axis 520 and the shaft 510 can rotate freely about the longitudinal axis 520. To enable rotation of the shaft 510 relative to the first speaker housing 412a, the first speaker housing 412a can include a bushing or bearing that receives the first end 510a of the shaft 510.

The clutch 530 of the illustrated example includes a first tab 534 and a second tab 536. The first tab 534 is coupled to a first end 510a of the shaft 510 and the second tab 536 is coupled to the first speaker housing 412a (e.g., a barrel, a frame, etc.). When the first tab 534 engages (e.g., frictionally engages, directly engages, etc.) the second tab 536, the clutch 530 is in the engaged position and both the shaft 510 and the first speaker housing 412a rotate together about the longitudinal axis 520. When the first tab 534 disengages (e.g., moves away from, etc.) the second tab 536, the clutch 530 is in the disengaged position and only the shaft 510 can rotate about the longitudinal axis 520. In some examples, a second end of the shaft 510 opposite the first end 510a and the second speaker housing 412h can include a clutch 530.

To bias the first speaker housing 412a in the first rotational direction 526 about the longitudinal axis 520, the drive system 403 of the illustrated example includes a biasing element 538. For example, the biasing element 538 is coupled to the first speaker housing 412a. The biasing element 538 can be a torsion spring, a leaf spring, a coil spring, a wire spring and/or any other suitable spring or biasing element. To limit rotation of the first speaker housing 412a in the first rotational direction 526 (e.g., when the clutch 530 is in the disengaged position 533), the drive system 403 of the illustrated example includes a travel limit 540. The travel limit 540 of the illustrated example is a stop tab 542 coupled to the base 108. However, in other examples, the travel limit 540 and/or the stop tab 542 can be coupled to other portions of the base 108 and/or any other fixed structure or frame of the electronic device 100.

Referring to FIGS. 5A-5C, in operation, the clutch 530 is in the disengaged position 533 and the rotating gear 516 disengages the fixed gear 518 when the electronic device 100 moves between the first configuration 102 and the second configuration 200. The clutch 530 is in the engaged position 531 and the rotating gear 516 engages (e.g., enmeshes, etc.) the fixed gear 518 when the electronic device 100 moves between the second configuration 200 and the third configuration 300. To move the electronic device 100 from the third configuration 300 as shown in FIGS. 5A and 5B to the second configuration 200 of FIG. 2, the drive system 403 receives an input to move the electronic device 100 via the processor 404. In response, the motor 508 rotates the shaft 510 in the first rotational direction 526 about the longitudinal axis 520. In turn, the rotating gear 516, which is enmeshed with the fixed gear 518, rotates in the first rotational direction 526 relative to the fixed gear 518. As the shaft 510 rotates about the longitudinal axis 520 in the first rotational direction 526, the biasing element 538 causes the first speaker housing 412a to rotate about the longitudinal axis 520 in the first rotational direction 526. The second tab 536, thus, remains engaged with the first tab 534 and the rotational speed of the shaft 510 controls the rotational speed of the first speaker housing 412a. The second tab 536 remains engaged with the first tab 534 until the second tab 536 engages the travel limit 540, which prevents further rotation of the first speaker housing 412a in the first rotational direction 526. In other words, the second portion 105b moves from a planar orientation of FIG. 3 to a sloping orientation of FIG. 2 (e.g., when the first speaker housing 412a rotates from a position of FIG. 5C to a position of FIG. 5D). Additionally, the cable 514 unwinds relative to the spool 512 when the shaft 510 rotates in the first rotational direction 526. Although a tension of the cable 514 decreases when the spool 512 rotates in the first rotational direction 526, a slack or tension in the cable 514 is increased or maintained by the angular displacement of the second portion 105b, which maintains the first portion 105a in the upright orientation of FIGS. 2 and 3. Thus, the cable 514 maintains a tension sufficient to hold the first portion 105a in an upright orientation (e.g., a vertical orientation) when the second portion 105b moves from the third display position 301 to the second display position 201. In other words, a distance between the end 514a and the spool 512 increases as the second portion 105b moves to the sloping position shown in FIGS. 1 and 2, thereby maintaining a tension in the cable 514 sufficient to maintain (e.g., hold) a position of the first portion 105a.

To move the electronic device 100 from the second configuration 200 to the first configuration 102, the motor 508 continues to rotate the shaft 510 in the first rotational direction 526. In the second display position 201, the rotating gear 516 is disengaged from the fixed gear 518. As noted above, the rotating gear 516 engages the fixed gear 518 along a first rotational path when the second portion 105b moves between the second display position 201 and the third display position 301 and disengages the fixed gear 518 along a second rotational path when the first portion 105a moves between the second display position 201 and the first display position 101. Additionally, when the rotating gear 516 disengages the fixed gear 518, the clutch 530 is in the disengaged position 533. For example, the first tab 534 disengages or moves away from the second tab 536 as the second tab 536 is in engagement with the travel limit 540. As the shaft 510 continues to rotate in the first rotational direction 526, the spool 512 rotates to unwind the cable 514. For example, the shaft 510 rotates relative to the first speaker housing 412a. The second portion 105b does not rotate because the second tab 536 is in engagement with the stop tab 542 when the display 104 moves between the first display position 101 and the second display position 201 The first portion 105a moves toward the second portion 105b via the third portion 105c to the first display position 101 (e.g., via gravity and/or the weight of the first portion 105a).

To move the display 104 to from the first display position 101 to the second display position 201, the motor 508 rotates the shaft 510 in a second rotational direction 528 opposite the first rotational direction about the longitudinal axis 520.

As the spool 512 rotates in the second rotation direction 528, the cable winds about the spool 512, thereby increasing a tension in the cable 514 and imparting a pulling force to the first portion 105a. In response, the first portion 105a moves from the first display position 101 to the second display position 201 via the third portion 105c. However, the second portion 105b does not move relative to the first portion 105a because the rotating gear 516 is not engaged with fixed gear 518 when the display 104 rotates between the first display position 101 and the second display position 201. Additionally, when the display 104 rotates between the first display position 101 and the second display position 201 the clutch 530 is in the disengaged position 533. In the disengaged position 533, the second tab 536 remains engaged with the stop tab 542 via the biasing force provided to the first speaker housing 412a by the biasing element 538 in the first rotational direction 526. As noted above, a bushing or bearing enables rotation of the shaft 510 relative to the first speaker housing 412a.

To move the display 104 from the second display position 201 to the third display position 301, the motor 508 continues to rotate the shaft 510 in the second rotational direction 528 to cause the rotating gear 516 to enmesh with the fixed gear 518. Additionally, the clutch moves to the engaged position 531 such that the first tab 534 engages the second tab 536. As noted above, rotation of the rotating gear 516 against the fixed gear 518 causes the second portion 105b to rotate relative to the base 108 via the connection with the first speaker housing 412a (e.g., and the second speaker housing 412b). Additionally, with the clutch 530 in the engaged position 531, the shaft 510 rotates the first speaker housing 412a in the second rotational direction 528 against the biasing force of the biasing element 538. Engagement between the fixed gear 518 and the rotating gear 516 imparts a rotational force (e.g., moment) about the shaft 510, causing the second portion 105h of the display 104 to rotate in the first rotational direction 526 from the orientation shown in FIG. 3 to the orientation shown in FIG. 2. For example, the motor 508 rotates the shaft 510 until the second portion 105b moves from the second display position 201 to the first display position 101. Additionally, the distance between the end 514a and the spool 512 decreases as the second portion 105b moves from the second display position 201 to the first display position 101. However, the spool 512 winds the cable 514 to increase or maintain a tension in the cable 514 sufficient to hold the position of the first display 105a as the second portion 105b rotates from the second display position 201 to the third display position 301.

In some examples, the drive system 403 can include an example biasing element (e.g., one or more springs, one or more elastic elements, etc.) to bias the display 104 into a particular configuration (e.g., the third configuration 300 of FIG. 3, etc.). In such examples, the drive system 403 activates to counteract the biasing element by articulating (e.g., pushing, pulling, tensioning, etc.) the display 104 from the biased profile (e.g., the third end profile 306, etc.) to another profile (e.g., the first end profile 112, the second end profile 204, etc.). In some examples, a tension of the cable 514 can be counteracted by a biasing element in the electronic device 100 (e.g., one or more springs, etc.).

In some examples, the drive system 403 includes a first drive system and a second drive system. For example, the first drive system can include a first motor and a first transmission to operate or control movement of the first display portion 105a between the first display position 101 and the second display position 201. For example, the second drive system can include a second motor and a second transmission to operate or control movement of the second display portion 105b between the first display position 101/the second display position 201 and the third display position 301. In some such examples, the processor 404 controls operation (e.g., timing) of the first and second drive systems. Additionally, in some such examples, the first drive system (e.g., the first transmission) is independent from the second drive system (e.g., the second transmission). For example, the first drive system can be dedicated to control rotation of the spool 512 (e.g., via the shaft 510) and the second drive system can be dedicated to control rotation of the first speaker housing 412a and/or the second speaker housing 412b. In some such examples employing independent or dedicated drives, the clutch 530 is not needed. In some examples, a third drive system operates rotation of the second speaker housing 412b. The third drive system can operate independently from the first drive system and/or the second drive system. In some examples, any other drive system, gear train, and/or transmission can be employed to rotate the first display portion 105a between the first display position 101 and the second display position 201 and rotate the second display portion 105b between the first display position 101/the second display position 201 and the third display position 301. In such examples, the speaker assembly 106 can be positioned at any other suitable location. For example, the speakers and/or the speaker assembly 106 can be incorporated into the base 108, coupled to the first portion 105a of the display 104, etc. In some examples, the speaker housing 412a and/or speaker housing 412b can be a structure that supports the shaft 510 and does not support the speakers. In such examples, the speakers can be positioned at any other suitable location.

FIGS. 6A-6D is an example schematic illustration of the electronic device 100 of FIGS. 1-4, 5A and 5B transitioning or transforming between the first configuration 102, second configuration 200, and third configuration 300. In the illustrated examples of FIGS. 6A-6D, the electronic device 100 has an additional transition configuration 602. While only one transition configuration is depicted in FIG. 6B, it can be appreciated that the electronic device 100 moves between additional transition configurations when transitioning between the first configuration 102 and the second configuration 200 and when transitioning between the second configuration 200 and the third configuration 300. The first portion 105a and the second portion 105b are coupled to, or otherwise inhibited, by a rigid structure (e.g., the rigid plates 502, 504, etc.) that prevents the first portion 105a and the second portion 105b from bending in response to a physical input (e.g., from a drive system, etc. As such, only the third portion 105c is able to bend in response to a physical input. In other examples, the third portion 105c can be composed of a flexible material (e.g., flexible OLED, etc.) and the first portion 105a and the third portion 105c can be composed of a rigid material (e.g., non-flexible OLED, etc.). Because the speaker assembly 106 is coupled to the second portion 105b of the display 104, as the orientation of the second portion 105b of the display 104 changes, the orientation of the speaker assembly 106 correspondingly changes.

The electronic device 100 can move between the configurations 102, 200, 300 in response to a command (e.g., a vocal command, a push-button command, a command from a mobile device, etc.), in response to a context (e.g., the electronic device 100 can transition to first configuration 102 in response to a command to output music, the electronic device 100 can transition to the third configuration 300 in response to a command to output a video, etc.) or on a schedule (e.g., move to the second configuration at a particular time, etc.). In such examples, a drive system (e.g., the drive system 403 of FIGS. 4, 5A and 5B, etc.) of electronic device 100 moves the display 104 into the display position corresponding to the commanded configuration. Additionally or alternatively, the electronic device 100 can be manually moved to another configuration (e.g., by a user physically moving the electronic device 100 into the desired configuration, etc.). In such examples, the electronic device 100 can include one or more biasing mechanisms or locking mechanisms to retain the electronic device 100 in the desired position.

In the illustrated example of FIGS. 6A-6D, when the electronic device 100 transitions from the first configuration 102 to the second configuration 200, the electronic device 100 transitions through the transition configuration 602. When transitioning between the first configuration 102 and the second configuration 200, the first portion 105a of the display 104 moves from a flat plane in a first lateral or horizontal direction to a flat plane in a second lateral or vertical direction. For example, the motor 508 of the drive system 403 can activate in response to a command, which causes the cable 514 to coil. In such examples, the second portion 105b remains stationary when the display transitions between the first configuration 102 and the second configuration 200 because the rotating gear 516 is not engaged with the fixed gear 518 in the illustrated example of FIG. 6A, which prevents the second portion 105b from rotating. As such, when transitioning between the first configuration 102 and the second configuration 200, the second portion 105b does not move. In some examples, the transition of the electronic device 100 from the first configuration 102 to the second configuration 200 allows accessories (e.g., accessories 119, the keyboard 302, the mouse 304, etc.) stored in the cavity 114 to be accessed by the user.

In the illustrated examples of FIGS. 6C and 6D, when the electronic device 100 transitions from the second configuration 200 to the third configuration 300, the third portion 105c of the display 104 moves from a curved position to a substantially straight position and the second portion 105b of the display 104 from a sloping position to a substantially straight position (e.g., vertical position). In such examples, the first portion 105a is displaced upward (e.g., via the movement of the second portion 105b and third portion 105c, etc.) but does not change orientation. For example, the motor 508 of the drive system 403 can activate in response to a command, which causes the cable 514 to coil about the spool 512. In the illustrated example of FIG. 6C, the rotating gear 516 is engaged with the fixed gear 518, which causes the second portion 105b to rotate when the motor 508 operates or rotates the shaft in the second rotational direction 528. In some examples, when the electronic device 100 transitions between the first configuration 102 to the third configuration 300, the electronic device 100 transitions through the second configuration 200. In other examples, when the electronic device 100 transitions between the first configuration 102 and the third configuration 300, the electronic device 100 does not transition through the second configuration 200.

Figure 7A:
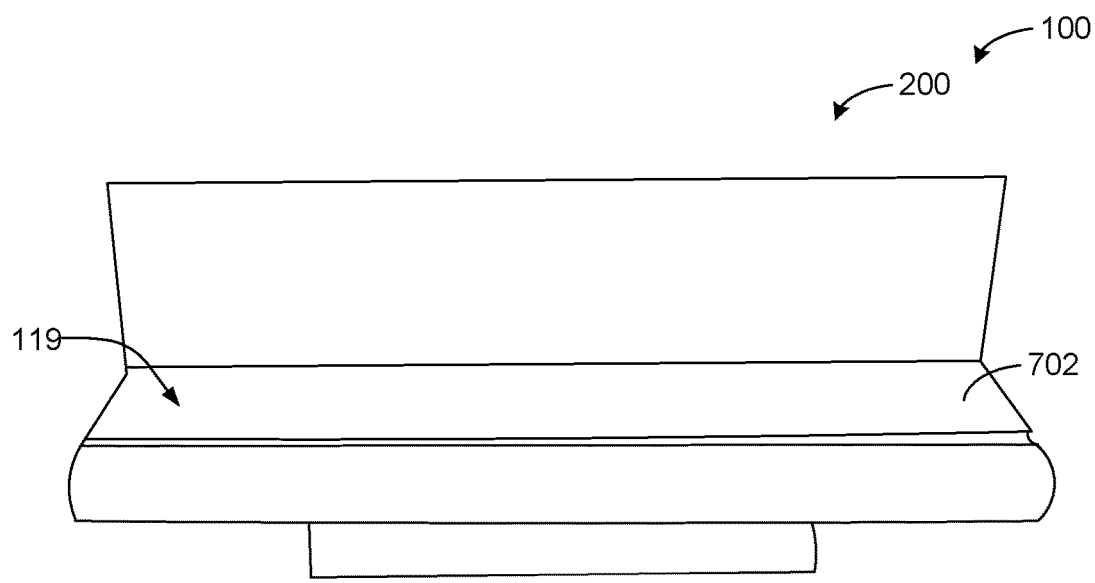
FIG. 7A is a front view of the example electronic device of FIGS. 1-3 showing an example lid covering different accessories.
Figure 7B:
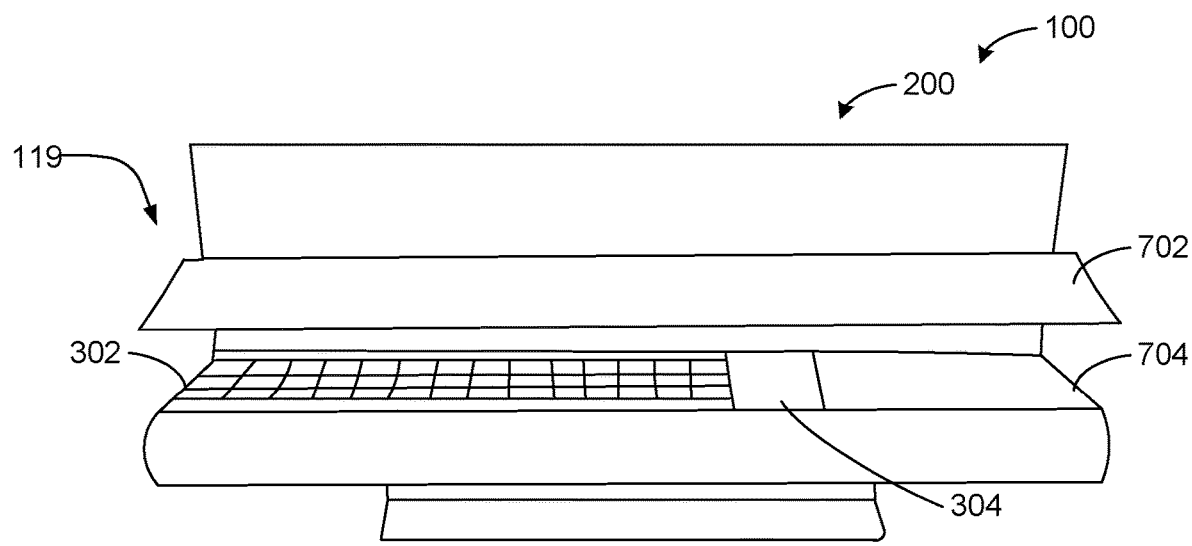
FIG. 7B is a front view of the example electronic device of FIG. 7B with the lid removed illustrating the accessories.

FIG. 7A is a front view of the example electronic device 100 of FIGS. 1-3 showing an example lid 702 covering different accessories 119. FIG. 7B is a front view of the example electronic device 100 of FIG. 7B with the lid 702 removed illustrating the different accessories 119. For example, the accessories can include the keyboard 302, the mouse 304, a keypad, a mouse, a touch pad, a number pad, a charging surface, or a storage compartment can be stored therein. In the illustrated example of FIGS. 7A and 7B, the electronic device 100 is in the second configuration 200 such that the example accessories(s) 119 can be accessed. In the illustrated example of FIG. 7A, the accessories) 119 are covered by the example lid 702. The example lid 702 protects the accessories(s) 119 from dust, liquids, and potential damage. In some examples, the lid 702 can retain the accessories 119 (e.g., via lip disposed about the perimeter of the lid 702, etc.) such that the accessories 119 do not separate from each other and/or from the electronic device 100. In some examples, the electronic device 100 does not include the lid 702.

In FIG. 7B, the lid 702 is lifted from the accessories 119, which uncovers the example keyboard 302 and the mouse 304. In the illustrated example of FIG. 7B, the keyboard 302 and the mouse 304 are sized such that there is additional room to stow another example accessory 704 in the display 104. The accessory 704 can include a keypad, a mouse, a touch pad, a number pad, a charging surface, a storage compartment, etc. in some examples, the space associated with the accessory 704 can be filed by an example placeholder structure or housing (e.g., a solid structure, a hollow structure, etc.).

Figure 8:
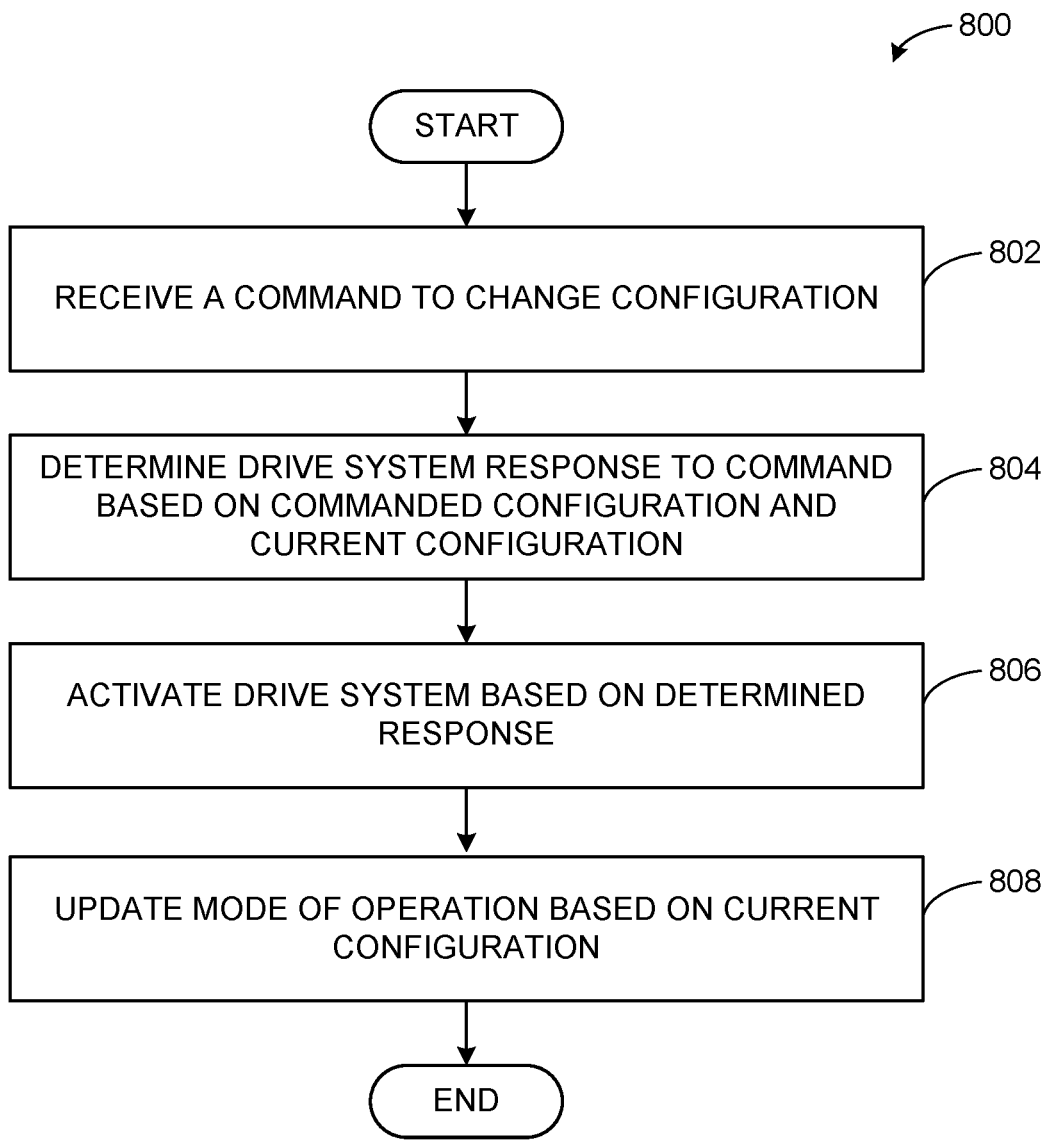
FIG. 8 is a flowchart representative of machine readable instructions which may be executed to operate the electronic device of FIGS. 1-7B.

A flowchart representative of example hardware logic, machine readable instructions, hardware implemented state machines, and/or any combination thereof for implementing the electronic device 100 is shown in FIG. 8. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example process 800 is described with reference to the flowchart illustrated in FIG. 8, many other methods of implementing the example electronic device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process 800 s of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The process 800 of FIG. 8 begins at block 802. The electronic device 100 can receive a command to change configuration. (Block 802). For example, the electronic device 100 can receive a verbal command via the microphone 110 (e.g., to change its physical configuration). In other examples, the electronic device 100 can receive a command via any other suitable method (e.g., a physical command, a command transmitted from another device, a scheduled command, etc.). The electronic device 100, via the processor 404, can then determine a drive system response to the command based on the command configuration and the current configuration. (Block 804). For example, if the electronic device is in the first configuration 102 and the command requested the third configuration 300, the processor 404 can determine how to operate drive system 403 to articulate the electronic device 100 into the third configuration 300. The drive system 403 is activated based on determined response. (Block 806). For example, the processor 404 can cause the drive system 403 to rotate in a manner to cause the electronic device 100 to move into the requested position. The mode of operation is updated based on the current configuration. For example, the processor 404 can cause the display 104 to output a GUI based on a mode of operation associated with the current configuration (e.g., the dashboard GUI 203 in the second configuration 200, etc.). The process 800 ends.

Figure 9:
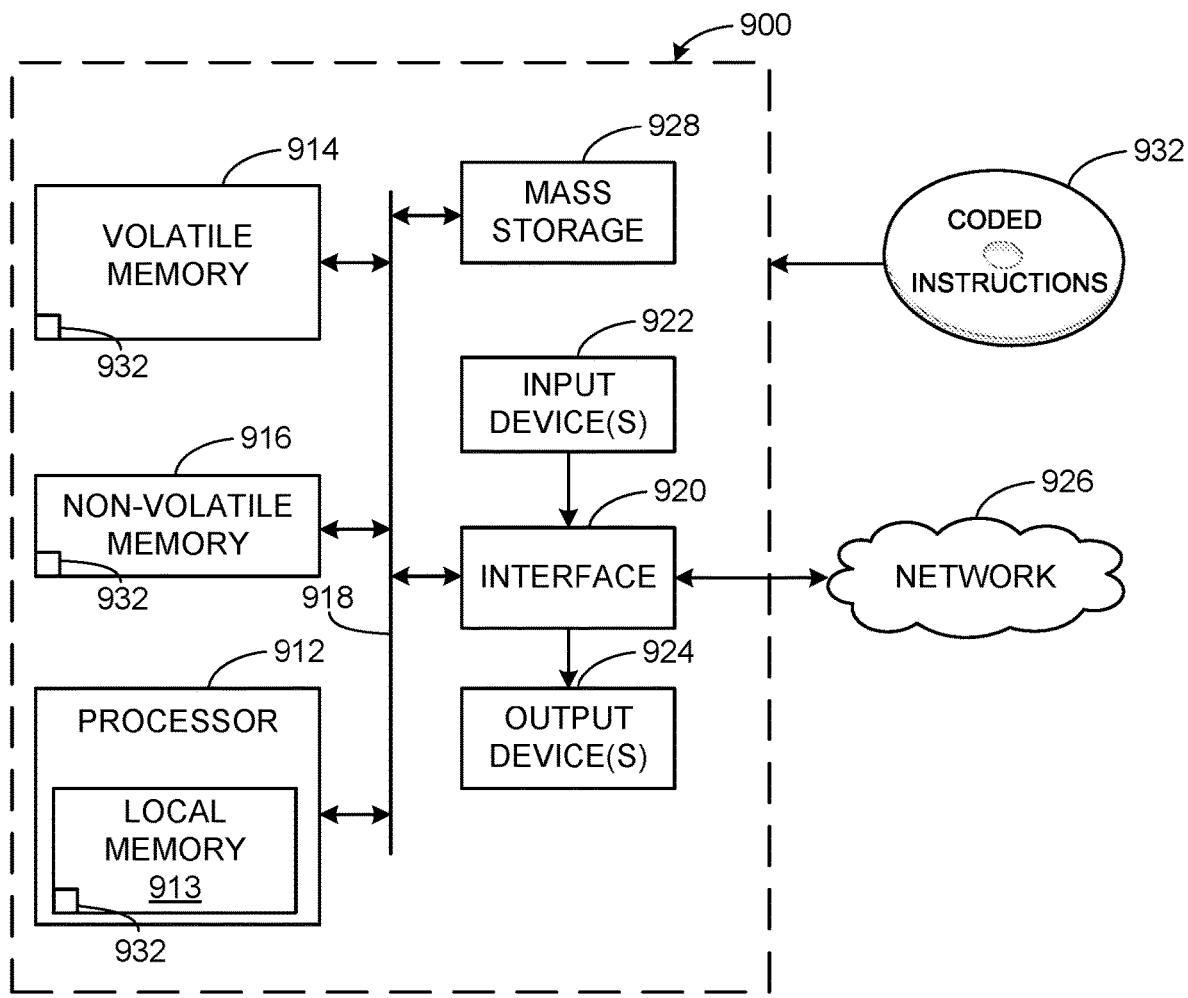
FIG. 9 is a block diagram of an example processing platform structured to execute the instructions of FIG. 3 to operate the electronic device of FIGS. 1-7B.

FIG. 9 is a block diagram of an example processor platform 900 structured to execute the instructions of FIG. 8 to operate the electronic device 100 of FIGS. 1-7B. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In some examples, the processor 912 is implemented by and/or implements the processor 404 of FIG. 4.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. The machine executable instructions 932 of FIG. 9 may be stored in the mass storage device 928, in the volatile memory 914, in the non-volatile memory 916, and/or on a removable non-transitory computer readable storage medium such as a CD or DVD.

Example methods, apparatus, systems, and articles of manufacture to electronic devices having multiple physical configurations are disclosed herein. Further examples and combinations thereof include the following:

Example 1 includes an electronic device comprising a display having a first rigid plate coupled to the display, a second rigid plate coupled to the display, and a flexible plate coupled to the display. The flexible plate is positioned between the first rigid plate and the second rigid plate. A drive is to move the display between a first physical configuration, a second physical configuration and a third physical configuration.

Example 2 includes the electronic device of example 1, wherein the first physical configuration is a speaker configuration, the second physical configuration is huh configuration, and the third physical configuration is a personal computer configuration.

Example 3 includes the electronic device of example 1, wherein the drive includes a motor, a shaft having a rotating gear, and a fixed gear.

Example 4 includes the electronic device of example 3, wherein the fixed gear is fixed to a base of the electronic device.

Example 5 includes the electronic device of example 3, further including a cable coupled to a spool, the spool being fixed to the shaft such that the spool rotates with the shaft.

Example 6 includes the electronic device of example 5, wherein the cable has an end coupled to the first rigid plate of the display.

Example 7 includes the electronic device of example 6, wherein the cable is to wind and unwind relative to the spool to move the display between the first physical configuration and the second physical configuration.

Example 8 includes the electronic device of example 7, wherein the rotating gear is to disengage the fixed gear to enable the display to move between the first physical configuration and the second physical configuration, and wherein the rotating gear is structured to engage the fixed gear to enable the display to move between the second physical configuration and the third physical configuration.

Example 9 includes the electronic device of example 1, wherein the flexible plate enables a first portion of the display to fold relative to a second portion of the display to form an enclosed profile defining a cavity when the display is in the first physical configuration.

Example 10 includes the electronic device of example 9, further including an accessory designed to fit in the cavity of the electronic device.

Example 11 includes the electronic device of example 10, wherein the accessory includes at least one of a keyboard, a mouse, a touch pad, a number pad, a charging surface, or a storage space.

Example 12 includes an electronic device comprising a flexible display movable between at least a first physical configuration, a second physical configuration, and a third physical configuration, the flexible display having a first planar portion, a second planar portion, and a foldable portion joining respective ends of the first and second planar portions, and a drive system to move the flexible display between the first physical configuration, the second physical configuration, and the third physical configuration.

Example 13 includes the electronic device of example 12, wherein the first physical configuration corresponds to a fully enclosed configuration of the flexible display, the second physical configuration corresponds to a partially exposed configuration of the flexible display, and the third physical configuration corresponds to a fully exposed configuration of the flexible display.

Example 14 includes the electronic device of example 12, wherein the first planar portion is in a first lateral orientation and the second planar portion in a sloping orientation when the electronic device is in the first physical configuration, and wherein the first planar portion is in a second lateral orientation different than the first lateral orientation and the second planar portion is in the sloping orientation when the electronic device is in the second physical configuration, and wherein the first planar portion, the second planar portion and the foldable portion are in the second lateral orientation when the flexible display is in the third physical configuration.

Example 15 includes the electronic device of example 12, wherein the drive system includes a spool, a cable disposed along a surface of the flexible display and about the spool, and a shaft to rotate the spool to cause the cable to move the flexible display between the first physical configuration and the second physical configuration.

Example 16 includes the electronic device of example 12, further including a speaker housing disposed on a surface of the flexible display, the speaker housing having a first orientation when the flexible display is in the first physical configuration and the second physical configuration, the speaker housing having a second orientation different than the first orientation when the flexible display is in the third physical configuration. example 17 includes the electronic device of example 16, further including a base, the base bisecting the speaker housing.

Example 18 includes an electronic device comprising a display movable between a first physical configuration, a second physical configuration and a third physical configuration, the first physical configuration corresponding to a substantially enclosed profile of the display, the second physical configuration corresponding to a partially exposed profile of the display, and the third physical configuration corresponding to a planar profile of the display, wherein a first portion of the display folds relative to a second portion of the display via a flexible portion positioned between the first portion and the second portion to form a cavity when the display is in the first physical configuration such that a screen of the display is hidden from view, and a drive system to move the display between the first physical configuration, the second physical configuration and the third physical configuration.

Example 19 includes the electronic device of example 18, wherein the electronic device includes a user interface, memory including instructions, and a processor to execute the instructions, which when executed cause the processor to in response to a command received, operate the drive system to move the display between the first physical configuration, the second physical configuration, and the third physical configuration, and present a graphic on the display when the display is in the second physical configuration or the third physical configuration.

Example 20 includes the electronic device of example 19, wherein the user interface includes a microphone and the command is a voice command. The following claims are hereby incorporated into this Detailed Description by this reference, with each claim standing on its own as a separate embodiment of the present disclosure.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An electronic device comprising:
a display having:
a first rigid plate coupled to the display;
a second rigid plate coupled to the display; and
a flexible plate coupled to the display, the flexible plate positioned between the first rigid plate and the second rigid plate; and
a drive to move the display between a first physical configuration, a second physical configuration and a third physical configuration, a radius of curvature of the flexible plate changes when the display moves between the first physical configuration, the second physical configuration and the third physical configuration.

2. The electronic device of claim 1, wherein the first physical configuration is a speaker configuration, the second physical configuration is hub configuration, and the third physical configuration is a personal computer configuration.

3. The electronic device of claim 1, wherein the drive includes a motor, a shaft having a rotating gear, and a fixed gear.

4. The electronic device of claim 3, wherein the fixed gear is fixed to a base of the electronic device.

5. The electronic device of claim 3, further including a cable coupled to a spool, the spool being fixed to the shaft such that the spool rotates with the shaft.

6. The electronic device of claim 5, wherein the cable has an end coupled to the first rigid plate of the display.

7. The electronic device of claim 6, wherein the cable is to wind and unwind relative to the spool to move the display between the first physical configuration and the second physical configuration.

8. The electronic device of claim 7, wherein the rotating gear is to disengage the fixed gear to enable the display to move between the first physical configuration and the second physical configuration, and wherein the rotating gear is structured to engage the fixed gear to enable the display to move between the second physical configuration and the third physical configuration.

9. The electronic device of claim 1, wherein the flexible plate enables a first portion of the display to fold relative to a second portion of the display to form an enclosed profile defining a cavity when the display is in the first physical configuration.

10. The electronic device of claim 9, further including an accessory to fit in the cavity of the electronic device.

11. The electronic device of claim 10, wherein the accessory includes at least one of a keyboard, a mouse, a touch pad, a number pad, a charging surface, or a storage space.

12. An electronic device comprising:
a flexible display movable between at least a first physical configuration, a second physical configuration, and a third physical configuration, the flexible display having:
a first planar portion;
a second planar portion; and
a foldable portion joining respective ends of the first and second planar portions; and
a drive system to move the flexible display between the first physical configuration, the second physical configuration, and the third physical configuration, the drive including:
a spool;
a cable along a surface of the flexible display; and
a shaft to rotate the spool to cause the cable to wind and unwind about the spool to move the flexible display between the first physical configuration and the second physical configuration.

13. The electronic device of claim 12, wherein the second physical configuration corresponds to a partially exposed configuration of the flexible display, and the third physical configuration corresponds to a fully exposed configuration of the flexible display.

14. The electronic device of claim 12, wherein the first planar portion is in a first lateral orientation and the second planar portion in a sloping orientation when the electronic device is in the first physical configuration, and wherein the first planar portion is in a second lateral orientation different than the first lateral orientation and the second planar portion is in the sloping orientation when the electronic device is in the second physical configuration, and wherein the first planar portion, the second planar portion and the foldable portion are in the second lateral orientation when the flexible display is in the third physical configuration.

15. The electronic device of claim 12, further including a speaker housing on a surface of the flexible display, the speaker housing having a first orientation when the flexible display is in the first physical configuration and the second physical configuration, the speaker housing having a second orientation different than the first orientation when the flexible display is in the third physical configuration.

16. The electronic device of claim 15, further including a base, the base bisecting the speaker housing.

17. An electronic device comprising:
a display movable between a first physical configuration, a second physical configuration and a third physical configuration, the first physical configuration corresponding to a substantially enclosed profile of the display, the second physical configuration corresponding to a partially exposed profile of the display, and the third physical configuration corresponding to a planar profile of the display, wherein a first portion of the display folds relative to a second portion of the display via a flexible portion of the display between the first portion and the second portion, the first portion of the display to orient toward the second portion of the display to form a cavity therebetween when the display is in the first physical configuration, a screen of the display carried by the first portion, the second portion and flexible portion, the screen being hidden from view when the display is in the first physical configuration; and
a drive system to move the display between the first physical configuration, the second physical configuration and the third physical configuration.

18. The electronic device of claim 17, wherein the electronic device includes:
a user interface;
memory;
instructions; and
a processor to execute the instructions to:
operate the drive system to move the display between the first physical configuration, the second physical configuration, and the third physical configuration; and cause presentation of a graphic on the display when the display is in at least one of the second physical configuration or the third physical configuration.

19. The electronic device of claim 18, wherein the user interface includes a microphone and the processor is responsive to a voice command to operate the drive system.

20. The electronic device of claim 17, wherein the display is a flexible display, the first portion of the display includes a first rigid plate coupled to the display, the second portion of the display includes a second rigid plate coupled to the display, and the flexible portion of the display includes a flexible plate coupled to the display.

* * * * *